Figure 1:
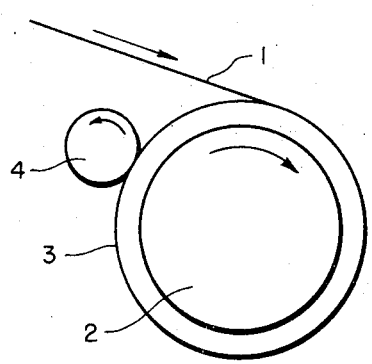

United States Patent [19]
Fairbairn

[11] 3,715,252
[45] Feb. 6, 1973

[54] METHOD AND APPARATUS FOR FORMING FILAMENT-WOUND ARTICLES

[75] Inventor: Geoffrey Fairbairn, Cambridge, England

[73] Assignee: Ciba-Geigy AG, Basel, Switzerland

[22] Filed: Aug. 25, 1971

[21] Appl. No.: 174,891

[30] Foreign Application Priority Data

Aug. 27, 1970 Great Britain.....................41,372/70

[52] U.S. Cl. ..................156/162, 117/102, 118/107, 156/173, 156/184, 156/446
[51] Int. Cl......B31c 13/00, B65h 81/00, B05c 11/10
[58] Field of Search......156/162, 184, 443, 169, 446, 156/173; 118/107, 110; 117/102 L

[56] References Cited

UNITED STATES PATENTS

| | | | |
|---|---|---|---|
| 3,168,414 | 2/1965 | Fleissner | 117/102 L |
| 1,846,845 | 2/1932 | Clark | 117/102 L |
| 3,271,187 | 9/1966 | Chen et al. | 118/110 X |
| 3,394,680 | 7/1968 | Groves | 118/107 X |

*Primary Examiner*—Philip Dier
*Attorney*—Karl F. Jorda et al.

[57] ABSTRACT

In making filament-wound articles from tape which comprises tows of fibers embedded in a resin, surplus resin is removed from the surface of the winding by contacting it with a hollow roller perforated on its surface, which rotates in the same direction as the winding and at the same speed as the winding, or slightly faster.

11 Claims, 5 Drawing Figures

PATENTED FEB 6 1973　　3,715,252

METHOD AND APPARATUS FOR FORMING FILAMENT-WOUND ARTICLES

This invention relates to fibrous-reinforced plastics materials, in particular to a process for making composites from fiber-reinforced plastics materials and to an apparatus for effecting this process.

Plastics materials reinforced with fibers, especially glass fibers, have achieved considerable commercial importance. The remarkable strength properties of bodies comprising continuous fibers or filaments encased in a matrix of resinous material are exploited in the process known as filament winding, in which the reinforcement consists of filamentous non-metallic or metallic materials in fibrous or tape form. Recently, fibers other than glass fibers have been used for filament winding, when it is especially convenient to use them in the form of a tape impregnated with the resin composition. Typically, these fibers are of carbon, boron, silicon carbide, silicon nitride, alumina, or metals (including glass-coated metal wires). The tape comprises continuous, aligned fibers impregnated with a resin composition which may have been applied as a viscous liquid or as a thin continuous solid film and then advanced to the B-stage.

In order to fabricate an acceptable winding, it is often necessary to reduce the viscosity of the resin composition by applying heat. The heated tape is laid in position under tension and the resin composition is cured. The tape contains an amount of resin composition in excess of that required to hold the fibers in place and, as the tape is wound around the former under tension, this excess of resin tends to migrate to the outer surface of the winding, carrying with it any air which may have been trapped in the tape during its formation.

However, this migration of resin to the outer surface of the winding can give rise to three defects in the final wound product. The first of these is a lateral displacement of subsequent layers, resulting in an uneven winding, the second is the presence of pockets of resin composition unreinforced by fibrous material between the windings, and the third is the presence of air pockets caused by air removed from one layer of windings and trapped under the subsequent layer. These defects result in an imperfect product which may have inadequate resistance to its working environment.

To overcome these defects it is necessary to remove the surplus viscous resin composition. However, removal is made difficult by the high viscosity of the resin composition. A scraper arrangement, such as a doctor blade, would remove some, at least, of the fibrous material with the resin, resulting in deformation of the remaining fibrous material.

The present invention provides a method by which surplus viscous resin composition may be removed from a winding without damage to the fibrous layer already laid down. It also provides a method by which distorted, loose ends of the fibers are re-aligned and smoothed to give a surface which is suitable for applying further layers of filamentous material bound in a resin composition matrix.

There is accordingly provided a method for manufacturing filament-wound articles from a tape comprising a plurality of tows of fibers, especially carbon fibers impregnated with a resin composition, wherein the tape is laid in position under tension on a former to form a winding at such a rate and temperature that excess of resin composition in the tape flows to the external surface of the winding and, before subsequent layers are added, the excess of resin composition is deposited on a hollow roller, perforated on its surface, whereby the excess of resin composition is removed from the winding.

Preferably the perforated roller is driven in such a manner that its periphery moves in the same direction as, but faster than, the winding with which it is in contact. In this manner the winding is smoothed down and loose ends of fiber are aligned correctly.

According to a further aspect of the invention there is provided an apparatus for removing excess of resin composition from the exterior surface of a filament winding which comprises means for supplying tape impregnated with resin composition to a rotatable former roller, means for rotating the former roller, means for winding the resin-impregnated tape onto the former to form a filament winding, a hollow rotatable roller, having a perforated surface and mounted to contact the filament winding, and means for removing the excess of resin composition from the hollow roller.

Figure 2:
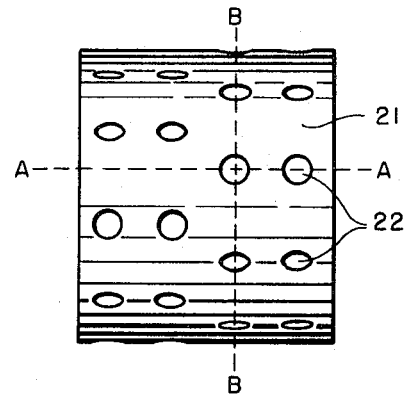
Figure 3:
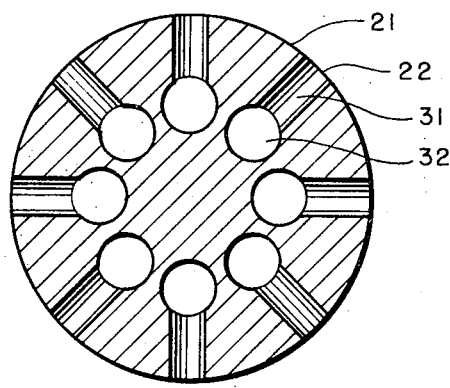
Figure 3A:
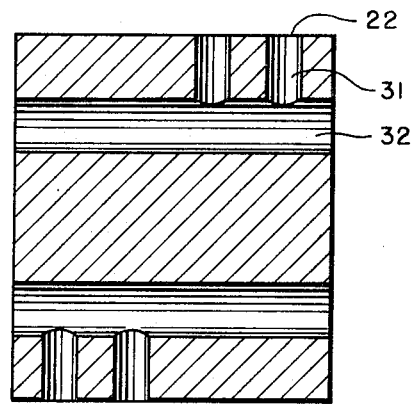
Figure 4:
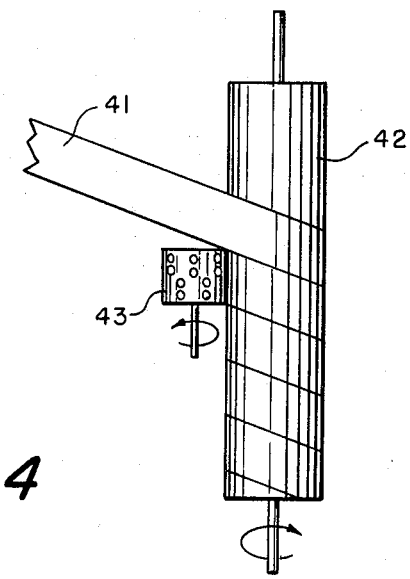

In order that the invention may be more fully understood, the following description is given with reference to the accompanying drawings in which:

FIG. 1 is an overall schematic elevational view illustrating a preferred embodiment of the apparatus of the invention FIG. 2 is a plan view of a roller used in accordance with a preferred feature of the invention FIGS. 3 and 3A are sectional views of a roller used in accordance with a preferred feature of the invention FIG. 4 shows an arrangement of the apparatus of the present invention which is of use when tape is helically wound upon a former.

Referring to FIG. 1, a tape of fibrous material impregnated with a viscous liquid resin composition is heated by conventional means (not shown) and the heated tape 1 is fed under tension onto a rotating former or mandrel 2. As the mandrel rotates, excess resin flows to the outer surface of the winding 3 and, just before a further layer of tape is applied, it is contacted with the perforated roller 4 which removes the excess of resin, enabling the tape to be laid directly onto the fibrous reinforcement of the previous layer,. The roller 4 may be driven by friction on the rotating surface of the winding or it may be driven independently so that the peripheral velocities of the touching surfaces are either the same or so that that of the perforated roller 4 is greater than that of the filament winding 3. The position at which the perforated roller 4 is placed in relation to the winding 3 can be varied but, preferably, the surplus resin composition is removed just before the next layer of tape is superimposed. It is essential, however, that the tape be held in contact with the former or mandrel for a time sufficient to allow resin to flow to the outer surface of the winding before the winding passes into the nip between the former and the perforated roller. We therefore prefer to place the perforated roller 4 such that it contacts the surface of the winding immediately before the next layer of tape is superimposed.

FIG. 2 illustrates one form of the perforated roller. The roller rotates about the axis AA and all around the outer surface 21 of the roller are cavities 22, which lead toward the horizontal axis of the roller. The position of these cavities is not critical but may be varied according to the particular circumstances.

FIG. 3 shows a cross-section of the roller illustrated in FIG. 2, taken along the line BB, whilst FIG. 3A illustrates a cross-section of this roller taken along the line AA. The surface cavities 22 are connected to channels 32 which are parallel to the rotational axis of the roller. Resin composition entering the cavities 22 is forced by the hydrostatic pressure of further incoming resin composition through the connecting tubes 31 into the channels 32 and along these to the ends of the roller from where it may be removed by known means, such as by a scraper blade.

A further variation of this process is illustrated in FIG. 4, in which the tape 41 is helically wound on a former 42. Due to the time taken for one winding to be superimposed by another, it is found more convenient to site the roller 43 in such a position that is contacts the winding a short time after the winding has been made, rather than just before the next layer is superimposed. The actual position of the roller will depend upon the circumstances but we have found that, in general, a satisfactory removal of excess resin composition is effected if the roller 43 is in contact with the winding immediately following that which is being laid.

The perforated roller may be made of any conventional material which is not attacked by the molten resin composition and to which the resin composition does not adhere too strongly. For ease of manufacture and general robustness we prefer rollers of polytetrafluoroethylene. The cavities may be circular or they may be elongated to form slots; they may be arranged symmetrically or in a random manner. Although the nature and arrangement of the cavities is not critical, it is important that the cavities should not be too large. The use of small cavities aids the flow of resin composition into the connecting channels and ensures that the surface of the roller is smooth, so preventing damage to the fragile fibrous reinforcement.

The perforated roller must be heated to approximately the same temperature as the rotating former or mandrel. This may be achieved either by heating the roller independently or, preferably, by allowing the roller to remain in contact with the former until it reaches the same temperature as the former before starting the winding process.

Tapes of the type used in the filament winding process of the present invention are, in general, commercially available, and they comprise glass, boron, silica carbide, silicon nitride, alumina, metal which may be encapsulated in glass, and especially carbon fibrous reinforcement, set in a resin matrix.

Suitable resins which are used in this process include single thermosettable resins such as an epoxide resin (i.e. a substance containing on average more than one 1,2-epoxide group per molecule), a resole formed from a phenol such as phenol itself and an aldehyde such as formaldehyde, an unsaturated polyester, a silicone resin, a melamine resin or a furan resin, or may be mixtures of thermosettable resins. Preferably they also contain a thermoplastic resin which is not heat-curable. Examples of such compositions are: resoles with, as the thermoplastic component, a poly(vinyl acetal) or a nylon; a novolac formed from a phenol such as phenol itself and formaldehyde or other aldehyde, with a neoprene rubber or an acrylonitrile rubber; and epoxide resins, with a phenoxy resin (i.e. a polyarylene polyhydroxy polyether, substantially free from 1,2-epoxide groups, which is a copolymer of a dihydric phenol with either a diglycidyl ether of a dihydric phenol or with epichlorohydrin, and contains recurring units of the formula

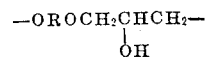

where R denotes an arylene group), a polysulphone (i.e. a polymer containing recurring units represented by the formula $-RSO_2-$, where R has the meaning previously assigned), or a copolymer of an α-olefin hydrocarbon with an α-olefin which is an ester of a carboxylic acid.

Suitable thermoplastic resin compositions may contain only one thermoplastic resin, such as a polycarbonate, a polyoxymethylene, a polyimide, a poly(benzimidazole), or a polyamide, or it may contain a mixture of thermoplastic resins.

The following Example illustrates the invention. Parts are by weight unless otherwise specified, and temperatures are in degrees Centigrade.

Resin Composition A comprises a blend of high and low molecular weight bisphenol A polyglycidyl epoxide resins having an average epoxide content of 3.21 equivalents/kg and, as curing agent, dicyandiamide together with a compound to accelerate the curing reaction. The composition softened at temperatures between 100° and 110°.

EXAMPLE

A fiber-reinforced ring 1.27 cm wide and 0.15 cm thick with an internal diameter of 14.75 cm was produced by winding a unidirectional tape 1.27 cm in width composed of 60 percent Rolls Royce intermediate, untreated carbon fiber and 40 percent Resin Composition A onto a mandrel.

The mandrel, made of steel, had an outside diameter of 14.75 cm and was fitted with two removable flanges 1.27 cm apart between which the tape was to be wound. Hot air from a blower was ducted around the mandrel, heating it evenly to a temperature of about 110°. The mandrel rotated at between 5 and 10 r.p.m.

A perforated roller, made of polytetrafluoroethylene, 1.27 cm wide and having an outside diameter of 5.08 cm, was biased against the mandrel under a load of 18.14 kg between the flanges at a point such that tape wound on the mandrel between the flanges would complete three quarters of a revolution before if passed into the nip between the roller and the mandrel. The axle of the perforated roller was attached to a sprocket which engaged in a chain wound round the mandrel. In this way rotation of the mandrel caused the perforated roller to rotate with a peripheral speed about 5 percent greater than that of the mandrel.

The tape, under a tension of about 6.8 to 9.1 kg, was wound onto the mandrel between the flanges. The tape entered the hot air zone around the mandrel about 7.5 cm before it came into contact with the mandrel and the resin in the tape had melted sufficiently to allow the tape to be bedded into position and the excess resin to collect on the outer surface of the tape before it passed into the nip between the perforated roller and the mandrel.

When the required thickness of tape had been wound, the tape was cut and the end was secured on the ring which was then cured on the mandrel by heating it for 1 hour at a temperature of 140°.

I claim:

1. In a method for making a filament-wound article from tape comprising a plurality of rows of fibers impregnated with a resin composition wherein the tape is laid in position under tension on a former to form a winding and resin composition which is in excess of that amount required to fill the interstices of the tape flows to the external surface of the winding, the improvement which consists in removing at least a portion of the excess of the resin composition by contacting the said portion with a hollow roller which is perforated on its surface.

2. A method according to claim 1 wherein the periphery of the perforated hollow roller moves in the same direction as, but faster than, the winding with which it is in contact.

3. A method according to claim 1 wherein the fibers are carbon fibers.

4. A method according to claim 1 wherein the resin is thermosetting.

5. A method according to claim 4 wherein the thermosetting resin also contains a thermoplastic resin.

6. A method according to claim 5 wherein the thermosetting resin is a resole and the thermoplastic resin is chosen from the group consisting of poly(vinyl acetals) and polyamides.

7. A method according to claim 5 wherein the thermosetting resin is a novolac formed from a phenol and an aldehyde and the thermoplastic resin is chosen from the group consisting of neoprene rubbers and acrylonitrile rubbers.

8. A method according to claim 5 wherein the thermosetting resin is an epoxide resin and the thermoplastic resin is chosen from the group consisting of phenoxy resins, polysulphones, and copolymers of $\alpha$-olefin hydrocarbons with $\alpha$-olefins which are esters of carboxylic acids.

9. Apparatus for filament winding, which comprises
   means for supplying tape impregnated with a resin composition to a former,
   means for winding the resin-impregnated tape onto the former to form a filament winding, and
   a hollow rotatable roller having a perforated surface, the said perforated surface contacting the filament winding.

10. An apparatus according to claim 9, which further comprises means for removing resin composition from the interior of the hollow roller.

11. An apparatus according to claim 9 wherein the hollow rotatable roller is of polytetrafluoroethylene.

* * * * *